United States Patent

[11] 3,598,967

[72] Inventor Robert M. Berler
Westport, Conn.
[21] Appl. No. 835,372
[22] Filed June 23, 1969
[45] Patented Aug. 10, 1971
[73] Assignee Pitney Bowes-Alpex, Inc.
Danbury, Conn.

[54] CODED PUNCHED HOLE DOCUMENT READER
5 Claims, 7 Drawing Figs.

[52] U.S. Cl. .......... 235/61.11 E
[51] Int. Cl. .......... G06k 7/14
[50] Field of Search .......... 235/61.11, 61.115; 250/219 D, 219 DC

[56] References Cited
UNITED STATES PATENTS

| | | | |
|---|---|---|---|
| 1,675,894 | 7/1928 | Lindridge | 235/61.11 UX |
| 3,042,912 | 7/1962 | Gilbert | 235/61.11 UX |
| 3,202,827 | 8/1965 | Robinson | 250/219 |
| 3,305,692 | 2/1967 | Girard | 250/237 |
| 3,308,276 | 3/1967 | Panagiotou et al. | 235/61.11 |
| 3,360,635 | 12/1967 | Wolf et al. | 235/61.11 |
| 3,375,348 | 3/1968 | Goldstern | 235/61.11 |
| 3,411,007 | 11/1968 | Thompson | 250/219 |
| 3,417,231 | 12/1968 | Stites et al. | 235/61.11 |

*Primary Examiner*—Daryl W. Cook
*Attorney*—Arthur J. Plantamura

ABSTRACT: An apparatus for reading intelligence contained on a document in the form of coded punched holes which includes novel means to produce registration between the spaced punched holes in the document and the respective photoelectric cells whose spacing in the array may differ from the spacing of the holes in the document. A simple inexpensive arrangement comprising a standard lamp and a mask is used to simulate a point source of light which in turn permits a magnified image of the punched hole array of a coded document to be cast with good resolution on to the array of photocells with controllable spacing to produce precise registration with the respective photoelectric cells in the hole-detecting array. A housing capable of substantially excluding light contains the document, light source, mask and photocell detector.

INVENTOR.
ROBERT M. BERLER

BY:
Arthur J. Plantamura
ATTORNEY.

INVENTOR.
ROBERT M. BERLER
BY
Arthur J. Plantamura
ATTORNEY.

CODED PUNCHED HOLE DOCUMENT READER

This invention relates to a device for reading coded information by optical means from a document containing data in a punched hole coded format. More particularly, the invention relates to an arrangement for a punched document reader which permits correspondence between the spacing of the holes in the punched document and the spacing of the several cells in a photoelectric cell array.

The novel means for translating hole spacing in a punched document from one spacing to another optically as provided by the invention is unique in that it simultaneously solves a number of problems in an unusually simple manner. These problems and the solutions afforded by the invention, will be discussed below.

Standard "off-the-shelf" photocell arrays are commonly available with cell to cell spacing, for example, of one-tenth -inch center to center. When a punched hole document having a hole spacing which is not standard, that is, not the same spacing as with the photocells in standard arrays, a means must be found to convert the hole spacing of the document by optical means to the spacing of the photocells in the array. If the hole spacing in the document is very close together, it may become difficult or impractical to place individual photocells sufficiently close together so that their spacing coincides with the spacing of the punched holes.

While various methods have been used or attempted to optically convert the hole spacing in the document to the cell spacing of the photocell array, some of which will be described below, such methods are generally relatively expensive and/or suffer from other disadvantages, e.g., complexity.

In accordance with the invention, conversion of document hole spacing optically so that it can be accomplished by simulating a point source of light which then permits magnification of the image produced by the array of holes of the punched document onto the photocell array.

To aid in a better understanding of the invention, it will be described in connection with a specific system wherein the holes punched in the document are spaced one-sixteenth inch apart center to center. The photocell spacing in the array is spaced one-tenth -inch apart.

In essence, the invention affords a simple and practical way of illuminating, while at the same time appropriately spacing the illuminated image of, the punched holes in the document so that they can be detected by the photocells in the array. While there are several ways in which punched hole documents are presently illuminated and read by photocells, each of these methods has certain drawbacks. For example, the following may be used:

1. Placing individual lamps behind each punched hole position in a line across the document.
2. Using a single tubular lamp with a single linear filament which is as long as the document is wide (i.e., the length of a single line of punched holes) beneath the punched document hole positions.
3. Positioning a light-diffusing screen beneath the punched document to illuminate the holes with a lamp placed beneath the diffusing screen.
4. Use of the fiber optic light pipes routed to each punched hole position and illuminated all by one lamp at the other end.
5. Use of the lens or other optical system.

In general, each of these methods of illuminating, while effective, is relatively costly and cumbersome or has other disadvantages. For example, all of these illumination methods require that the photocell array be spaced in close proximity to the punched document except where a fiber optic light pipe pickoff or lens system is used in conjunction with the photocell array. A lens system has the disadvantage in that it is expensive, adjustments are critical, and is susceptible to dust and lint. A long linear filament lamp is expensive and not very rugged; additionally, the filament must not be allowed to sag. Fiber optics is a costly arrangement.

In accordance with the invention, a very simple highly satisfactory and inexpensive method, which involves no lenses, fiber optics, or mirrors is provided to afford the necessary correspondence between coded document hole spacing and the spacing of the several photocells in the array for reading the document. An inexpensive lamp, operated in a derated manner for a very long life expectancy, is used as the light source.

It is an object of this invention to provide an improved reader for punched hole coded documents.

It is another object of the invention to provide a punched hole document reader capable of reading documents whose spacing between the punched holes differs from the spacing between the several photocells of the reader array.

It is a further object of the invention to provide an optical reader which uses no lenses and still permits magnification of an image, uses direct light transmission through holes in opaque material, and has excellent signal-to-noise ratio.

These and other objects of the present invention will become more fully apparent from the following specification and claims when considered in conjunction with the accompanying drawing wherein:

Figures 4A, 4B, 4C:
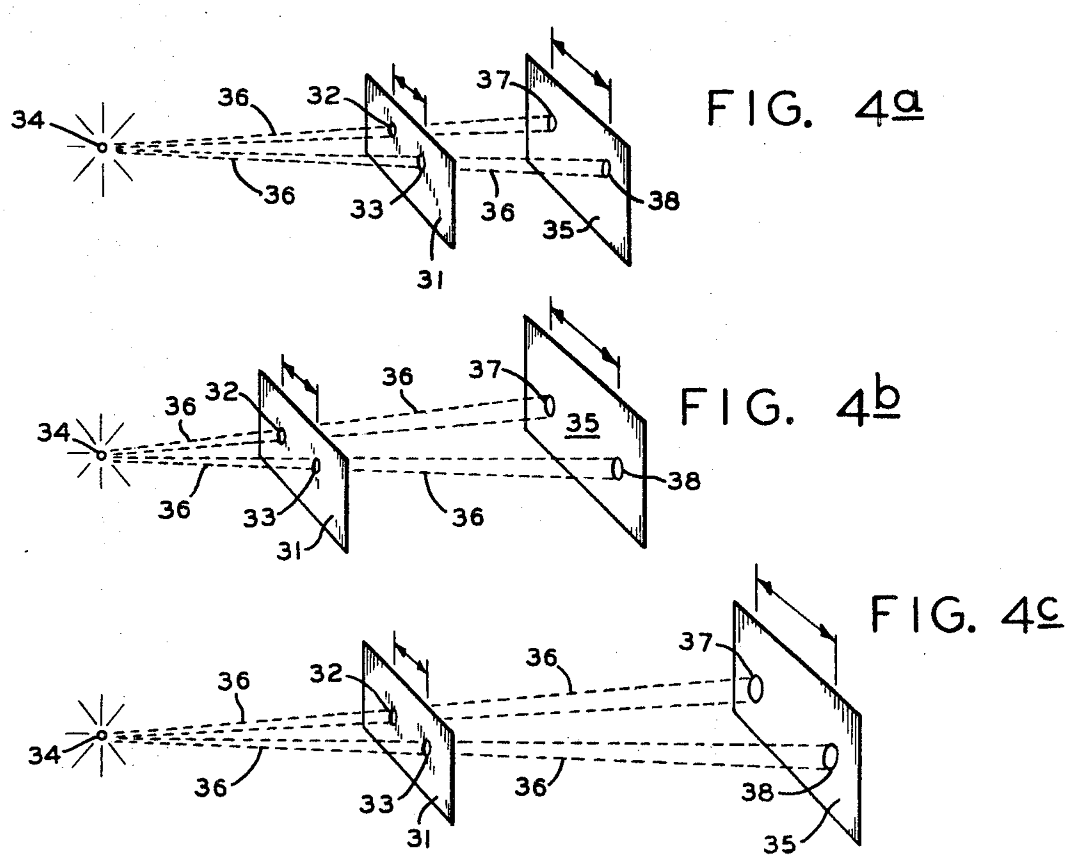

FIGS. 4*a*, 4*b* and 4*c* illustrate by their respective views the means whereby magnification of hole spacing of a document to be read may be varied.

Figure 5:
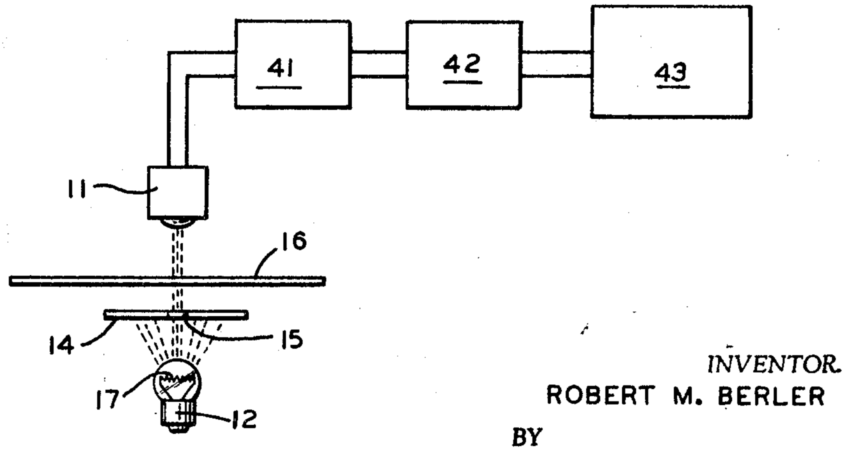

FIG. 5 is a diagram showing the reading device of the invention accompanied by a block diagram to illustrate use of the reader in a system.

The apparatus of the present invention is a punched hole ticket or card reader that reads the punched hole coded format by optical means.

The avoidance of conventional optical components, e.g., lenses in the system, is an important cost-saving factor; also the avoidance of delicate components prevents malfunctions from dust or dirt. The light source used in this invention is a conventional commercially available 6.4-volt automobile lamp, such as type 1130. Any other similar-type lamp may be used. At rated voltage, life expectancy of this or similar lamps is about 200 hours. With half voltage (3.2), its life expectancy is approximately 800,000 hours of continuous 24-hour service, i.e., (about 90 years) because lamp life varies approximately inversely to the 12th power of the ratio of the applied voltage vs. the rated voltage. (Derived from the lamp manufacturer life expectancy formula.) Thus, at half voltage, the normal rated life of 200 hours is multiplied by $2^{12}$ or $200\times4{,}096=819{,}200$ hours. In addition to a long-life expectancy, there will be negligible blackening inside of the glass bulb due to minimal, if any, metal evaporating off the filament at the relatively low temperatures experienced by burning the lamp at half the rated voltage.

Figure 1:
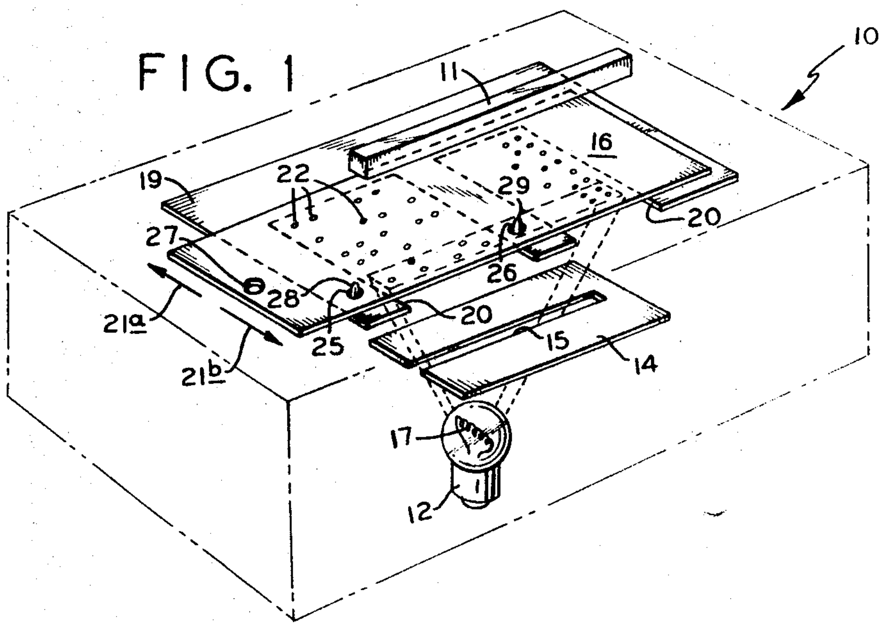
FIG. 1 is a perspective view of the several parts which cooperate to provide the reader of the invention with the housing for the reader shown in phantom.

Referring to FIG. 1 of the drawing, the simplicity of the document reader 10 becomes evident by the fact that the only components used in addition to the punched document 16 and the photocell array 11 is the automobile-type lamp 12 and an opaque mask 14 with an aperture 15, e.g., either a small hole or narrow slit, in it. The mask 14 is situated next to the lamp 12 and is placed so that the light slit or hole aperture 15 is aligned between the lamp filament 17 and the photocell array 11. The filament 17 of the 1130 lamp 12, although tightly coiled, forms a segment of a straight line as far as the length of the filament 17 is concerned. By placing a narrow light slit 15 next to the lamp 12, and situated such that the slit 15 is positioned at right angles to the line that the filament 17 makes, an approximation of a point source of light is produced. A point source of light will permit a magnified image of an object to be cast on a screen with good resolution a considerable distance away. Illustrated as a support for the card 16 is a suitable carriage or tray 19 appropriately formed as with openings 20 to allow passage of light and preferably constructed so as to be movable in and out of alignment between the light projected by lamp 12 through punched holes 22 into the photocell of the bank 11 as shown by arrows 21*a* and 22*b* respectively.

While an ideal arrangement would employ a perfect point source of light wherein light rays radiate in all directions from the point source without one ray crossing over another, the arrangement of the invention affords a practical alternate as seen by reference to FIGS. 4*a*, 4*b* and 4*c*. As shown, an opaque mask 31 with two holes 32 and 33 in it to simulate a punched hole document is placed at a distance from the point source of light 34. A screen 35 is placed a fixed distance behind the mask so that the light 36 passing through the two holes will fall onto the screen 35, forming images 37 and 38 of the two holes 32 and 33 respectively.

The size of the images 37 and 38 and their spacing on the screen 35 will be magnified compared to the size of the holes 32 and 33 and their spacing in the mask 31. This is due to the spread of the diverging light rays 36 passing through the holes in the mask. The magnification of the light images 37 and 38 can be increased in two ways as seen in FIGS. 4*b* and 4*c*.

Firstly, the screen 35 remains fixed in position and the mask 31 is moved closer to the light source 35. The holes 32 and 33 will intercept light rays 36 with a larger angle of divergence. See FIG. 4*b*. The images 37 and 38 will be larger than those shown in FIG. 4*a* as will the hole separation.

Alternately, the mask 31 remains fixed in position as in FIG. 4*a*, but the distance between the mask 31 and the screen 35 is increased. See FIG. 4*c*. With the original angle of ray divergence of FIG. 4*a*, the greater distance between the mask 31 and the screen 35 permits the images 37 and 38 to be magnified to a greater size and hole separation. It is thus seen that light image magnification can be achieved over a limited range without a lens system. The "screen," in the reader, is represented by the photocell array 11, FIGS. 1 and 2. The proper distances are chosen so that the document holes are magnified to the right size so that each hole position is picked up by each photocell position in the array.

Figures 2, 3:
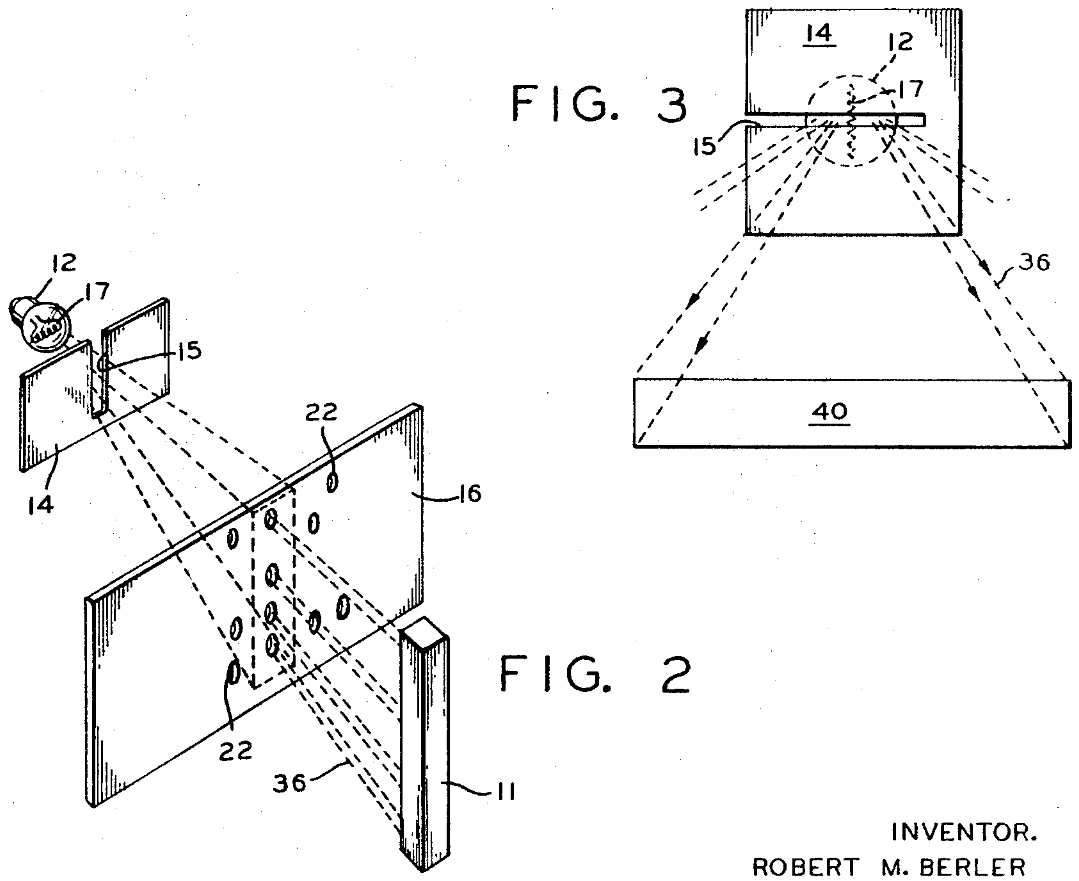
FIG. 2 is an exploded view illustrating the main elements of the reader in perspective.
FIG. 3 is a fragmentary view illustrating the generation of a point source of light.

As shown graphically in FIG. 3, a slit 15, rather than a hole is used preferably in front of the lamp because it allows a wide band 40 of light to illuminate the entire width, i.e., a complete line of holes in the document. The light slit 15 in the mask 14 placed in front of the lamp with filament 17 at right angles to the slit, approximates a point source of light.

In the optical system provided by the reader of the invention, the photocell array is spaced away from the punched hole document in order to take advantage of the magnifying action of divergent light rays. This is a worthwhile advantage since the photocell windows are less likely to collect dust or to get scratched as they would when in contact with a moving document over a period of time. In the case when no magnification is required between the document holes and the spacing of the individual photocells (one-to-one ratio), collimated light can be used on the illuminated side of the document. Here again, the photocell spacing may be such that it can be located away from the document to prevent dust and scratches.

The present invention is devised for the purpose of providing a simple, inexpensive, compact, hand-powered means of reading merchandise inventory-identification tickets. These tickets are generally attached to articles of clothing by pin or string (not shown) attached at 27. Ordinarily with such tickets, a section of a multiple part ticket is torn off and is used for data processing at a time later than the time when the actual sales transaction has been made; at such installations these tickets are processed by relatively expensive high-speed readers. An important advantage of the document reader of the present invention is to allow a single ticket to be read while it remains attached to a piece of merchandise at the point of sale, i.e., right at the counter or cash register. Instead of punching in the information on the register keyboard, the ticket is inserted into the reader and then withdrawn. All the information on the ticket has now been entered into the computing system without human error or lost time.

As a specific example, since the holes of at least one of commercial employed punched hole documents, i.e., the Kimball ticket, are spaced one-sixteenth inch apart, and since the holes are to be read across the length of the ticket rather than across its width when scanning, the edge of the ticket cannot be used as a photocell space reference. Instead, all punched data holes must be referenced to two relatively large spindle or reference holes 25 and 26 (see FIG. 1). The ticket may be placed on the moving transport 19 and held in proper position for photocell reading by placing the holes 25 and 26 in the ticket over two pins 28 and 29. These pins hold the ticket in accurate alignment as it is moved past the photocell hole sensors. The transport windows 20 allow the locations of all coded fields to be illuminated on the ticket 16 and thereby scanned by the photocells in the array 11.

FIG. 5 depicts a schematic arrangement which may be used for translating the light impulses or signals projected through the punched holes 22 in the document 16. The signals sensed by the respective photoelectric cells in the bank 11 are processed in a conventional manner such as through the amplifier 41 and the decoder 42 to provide the desired output for a computer at 43.

While the invention has been described by reference to specific particulars in order to provide a full, clear, and concise explanation of the inventive contribution, various modifications in the invention will be apparent to those skilled in the art without departing from the scope and spirit of the invention.

What I claim is:

1. A manually operable apparatus for reading a document upon which information is coded in a pattern comprising a plurality of lines of punched holes, said apparatus comprising a movable transport to receive and to carry said document into reading position within said apparatus as said transport is manually actuated, a light source arranged on one side of said transport to transmit light through the punched holes of a document to be read, detector means comprising a plurality of photocells aligned in a bank to simultaneously sense a line of punched holes of a document to be read on the other side of said transport, and a substantially opaque mask interposed between said light and document transport and provided with an opening permitting light to pass therethrough in a manner simulating a light point source, said transport being positioned in the reader at a location so that the light image passing through the spaced punched holes of each line of a document carried thereon registers with a corresponding cell in the photocell bank.

2. An apparatus in accordance with claim 1 wherein the light source comprises an automobile-type headlight lamp which is derated and wherein the opening in said mask is a slit which is positioned so as to be at an angle of substantially 90° with the filament of said lamp.

3. An apparatus in accordance with claim 1 wherein said opaque mask is linearly adjustable between said light source and said document support.

4. In a coded punched hole document reader comprising a light source, a photoelectric cell reader bank and means to position for reading a punched hole document between said light source and bank, the method for producing simultaneous registration of light impulses projected through a line of coded holes in a punched hole document and the several corresponding cells in a bank of photoelectric cells having a fixed space between the individual cells which is larger than the space between punched holes in the document to be read comprising, generating a point source of light with an opaque mask and positioning said mask at a linear location between said light source and punch hole document means so that light projected through a line of holes of a particular spacing in a document registers with the corresponding greater cell spacing of photocells in said bank.

5. In a method of reading simultaneously a line of a coded punched hole document by projecting light through the holes in the document onto a photocell array whose spacing between the individual cells in the array is greater than the spacing between the holes of a line of holes of a coded document to be read, the improvement which includes changing the hole spacing in the light images of a line of punched holes in the document to be read by simulating a point source of light using a substantially opaque mask with a suitable light opening which is interposed between the light source and the document to be read, adjusting the distance between said punched hole document and photocell array so as to produce the desired magnification and thereby register the light image of a line of punched holes with the corresponding photocells, and maintaining said distance between the document and the photocell array as each line of code on the document to be read is moved between said light source and photocell array.